US011738887B2

(12) United States Patent
Cates et al.

(10) Patent No.: US 11,738,887 B2
(45) Date of Patent: Aug. 29, 2023

(54) METHOD AND SYSTEM FOR EVALUATING ROTOR-MAST FATIGUE DAMAGE

(71) Applicant: Bell Textron Inc., Fort Worth, TX (US)

(72) Inventors: Steve Cates, Arlington, TX (US); Caydn White, Fort Worth, TX (US); Kevin Brooker, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 376 days.

(21) Appl. No.: 17/118,265

(22) Filed: Dec. 10, 2020

(65) Prior Publication Data

US 2022/0187223 A1 Jun. 16, 2022

(51) Int. Cl.
*B64F 5/60* (2017.01)
*B64C 27/00* (2006.01)
*G01N 23/207* (2018.01)

(52) U.S. Cl.
CPC ............. *B64F 5/60* (2017.01); *B64C 27/006* (2013.01); *G01N 23/207* (2013.01); *G01N 2223/056* (2013.01); *G01N 2223/607* (2013.01); *G01N 2223/632* (2013.01); *G01N 2223/646* (2013.01)

(58) Field of Classification Search
None
See application file for complete search history.

(56) References Cited

U.S. PATENT DOCUMENTS

| | | | | |
|---|---|---|---|---|
| 7,206,378 B2* | 4/2007 | Obata | ............. | G01N 23/20016 378/162 |
| 8,855,266 B2* | 10/2014 | Yasukawa | ............ | G01N 23/207 378/63 |
| 9,222,900 B2* | 12/2015 | Lauridsen | ............ | G01N 23/207 |
| 2012/0140890 A1* | 6/2012 | Ozawa | ................ | G01N 23/207 378/74 |

OTHER PUBLICATIONS

Whitlow, M., et al.; Laboratory Report; Residual Stress Analysis 407 Main Rotor Mast; Report No. 19-0680; Item 407-040-038-123, S/N-936; Metallic Materials & Processes Laboratory, Bell Textron Inc.; dated Jul. 9, 2019; 2 pages.

Weiner J., et al.; Laboratory Report; Residual Stress Analysis 407 Main Rotor Mast; Report No. 18-1026; Item 407-040-038-123 & 407-040-038-111; Metallic Materials & Processes Laboratory, Bell Textron Inc.; dated Sep. 20, 2018; 2 pages.

Whitlow, M., et al.; Laboratory Report; Residual Stress Analysis 407 Main Rotor Mast; Report No. 19-0680 Rev. A; Item 407-040-038-123, S/N-936; Metallic Materials & Processes Laboratory, Bell Textron Inc.; dated Oct. 31, 2019; 2 pages.

(Continued)

*Primary Examiner* — Octavia Davis Hollington
*Assistant Examiner* — Jermaine L Jenkins
(74) *Attorney, Agent, or Firm* — Bradley Arant Boult Cummings LLP

(57) ABSTRACT

A method of evaluating fatigue damage of a rotor mast. The method includes performing an x-ray diffraction ("XRD") inspection of the rotor mast, assessing fatigue damage sustained by the rotor mast based on results of the XRD inspection, and determining whether the rotor mast is suitable for continued use based on the assessed fatigue damage.

18 Claims, 2 Drawing Sheets

(56) References Cited

OTHER PUBLICATIONS

Fiala Jaroslav et al: Evaluation of Fatigue Damage by X-Ray Diffraction Technique of Steam Turbine Rotor Steels at Elevated Temperatures:, vol. 5: High Pressure Technology: Nondestructive Evaluation Division; Student Paper Competition, [Online] Jan. 1, 2009, pp. 159-162, https://citeseerx.psu.edu/viewdoc/download?doi-10.1.1.1044.260&rep=rep1&type=pdf>.

Sjoholm L et al: "Rotor Evaluation Regarding Runout Rotor Evaluation Regarding Run Out", International Compressor Engineering Conference. Paper, Jan. 1, 1998; pp. 1-7, https://docs.lib.purdue.edu/cgi/viewcontnt.cgi?refern=https:www.google.com/&httpsredir=1&article=2303&contnt=icec.

Snoha, Daniel J. et al: "X-ray Diffraction as a Means to Assess Fatigue Performance of Shot-Penned Materials", Army Research Lab Aberdeen Proving Ground MD Weapons and Materials Research Directorate, Jun. 1, 2012; pp. 1-28; https://apps.dtic.mil/sti/pdfs/ADA5689814.pdf.

* cited by examiner

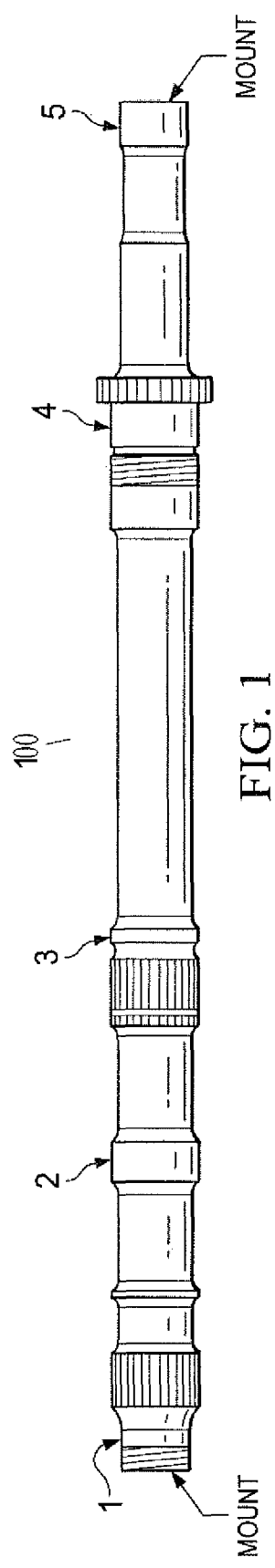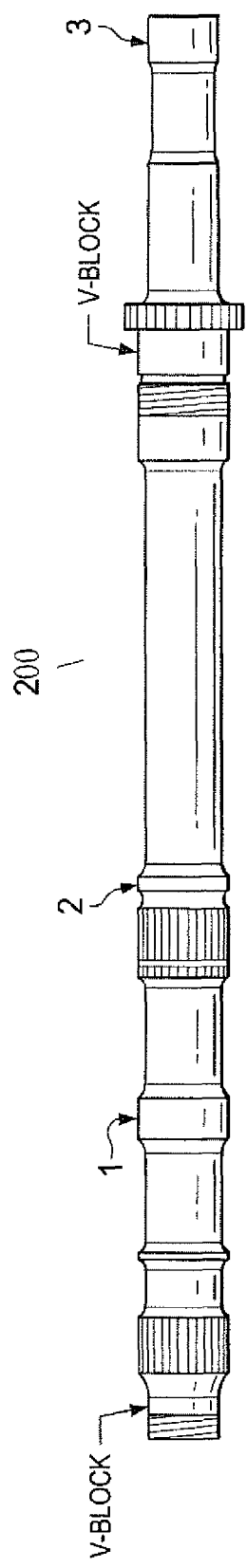

even small levels that would otherwise go undetected by a TIR inspection. In this way, good rotor masts can be preserved in service instead of being scrapped in an abundance of caution.

METHOD AND SYSTEM FOR EVALUATING ROTOR-MAST FATIGUE DAMAGE

TECHNICAL FIELD

The present disclosure relates generally to evaluation of rotor-mast fatigue damage and more particularly, but not by way of limitation, to evaluation of rotorcraft rotor-mast fatigue damage using x-ray diffraction.

BACKGROUND

This section provides background information to facilitate a better understanding of the various aspects of the disclosure. It should be understood that the statements in this section of this document are to be read in this light and not as admissions of prior art.

When a rotor mast of a rotorcraft is involved in an incident in which damage to the rotor mast may have occurred or during routine scheduled maintenance, an inspection process may be undertaken to determine the serviceability of the rotor mast. If bending or torsional design loads on the rotor mast have been exceeded, it is often difficult to evaluate whether the rotor mast has been damaged to such a degree that the rotor mast should be removed from service and replaced. Traditional inspection methods utilize total indicated run-out ("TIR") inspection to endeavor to detect imperfections of form that cause a cylindrical rotating part such as the rotor mast to "run out", meaning the rotor mast does not rotate with acceptable smoothness. These conditions include, for example, being out-of-round, eccentricity, and being bent axially.

In a typical TIR inspection, an effort is made to assess whether, and to what extent, run-out has occurred. The run-out indicates, for example, that the rotor mast has taken a permanent bend. A TIR inspection can usually detect major damage to the rotor mast; however, less significant incidents can cause more subtle fatigue damage to the rotor mast that may yield inconclusive results from a TIR inspection. In such cases, serviceable rotor masts may be scrapped and replaced out of an abundance of caution due to the inconclusive results.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A method of evaluating fatigue damage of a rotor mast. The method includes performing an x-ray diffraction ("XRD") inspection of the rotor mast, assessing fatigue damage sustained by the rotor mast based on results of the XRD inspection, and determining whether the rotor mast is suitable for continued use based on the assessed fatigue damage.

A method of evaluating fatigue damage of a rotor mast. The method includes performing an XRD inspection of the rotor mast at positions of the rotor mast most likely to be damaged in an accident and, responsive to the step of performing the XRD inspection, determining whether the rotor mast is suitable for continued use.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 1 illustrates a first rotor mast;
FIG. 2 illustrates a second rotor mast.

DETAILED DESCRIPTION

Figure 3:
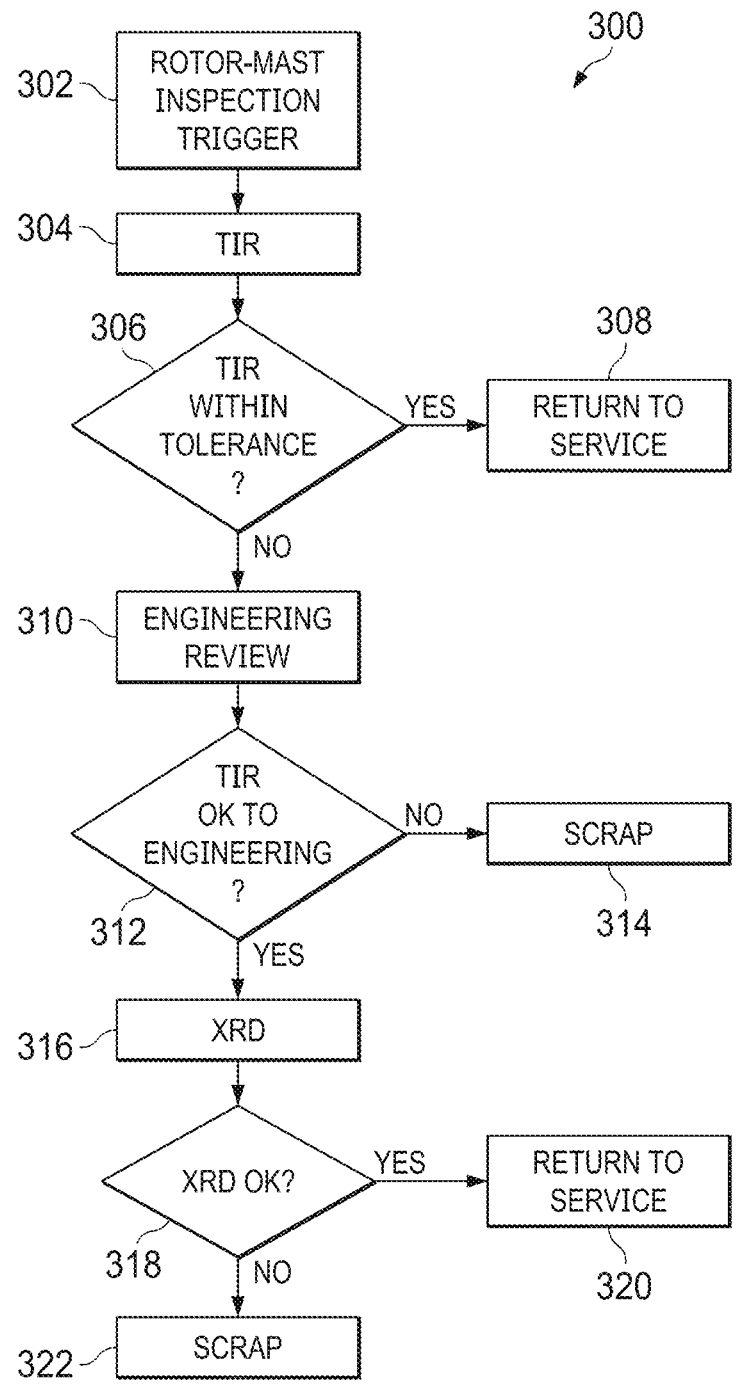
FIG. 3 illustrates a flow process for inspection of a rotor mast.

Various embodiments will now be described more fully with reference to the accompanying drawings. The disclosure may, however, be embodied in many different forms and should not be construed as limited to the embodiments set forth herein.

FIG. 1 illustrates a rotor mast 100. The rotor mast 100 is shown mounted at each end thereof at the respective centers of the rotor mast 100. The centers of the rotor mast 100 are coaxial with a primary axis of the rotor mast 100. A TIR inspection includes rotation of the rotor mast 100 about the primary axis of the rotor mast 100 and measurement of total indicated run-out. In a typical case, maximal acceptable run-out at one or more locations along the length of the rotor mast 100 is on the order of 0.03-0.30 mm. Measurement locations 1-5 are illustrated on the rotor mast 100. Those having skill in the art will appreciate that additional or different measurement locations may be used as needed.

FIG. 2 illustrates a rotor mast 200. The rotor mast 200 is shown resting on V-blocks at two locations along the length of the rotor mast 200. A TIR inspection includes rotation of the rotor mast 200 about the primary axis of the rotor mast 200 and measurement of total indicated run-out. In a typical case, maximal acceptable run-out at one or more locations along the length of the rotor mast 200 is on the order of 0.05-0.33 mm. Measurement locations 1-3 are illustrated on the rotor mast 200. Those having skill in the art will appreciate that additional or different measurement locations may be used as needed.

If a TIR inspection of a rotor mast is inconclusive or marginally outside established tolerance values, an x-ray-diffraction ("XRD") inspection can be performed on the rotor mast and data obtained therefrom used to support a determination whether the rotor mast is in acceptable condition to be returned to service. XRD inspection can be performed on rotor masts that fail TIR tolerance limits during routine maintenance or during conditional inspections that include a straightness inspection. The rotor mast can be inspected in this way and data thereby obtained compared, for example, against baseline data taken from inspection of critical areas on an undamaged rotor mast.

The manufacturing process of rotor masts typically includes a process referred to as shot peening. Shot peening is a cold working process used to produce a compressive residual stress layer and modify the mechanical properties of the rotor mast that entails striking the surface of the rotor mast with shot with force sufficient to create plastic deformation. Shot peening creates a compressive stress zone on the rotor mast. If the compressive stress is found to have been reduced, an XRD inspection will reveal the reduction in compressive stress. The reduction in compressive stress is indicative of damage to the rotor mast.

An XRD inspection can detect fatigue damage to the rotor mast in situations which the fatigue damage is undetectable via measurement of the dimensions of the rotor mast, such as via TIR inspection. The XRD inspection process permits fatigue damage suffered by the rotor mast to be detected at a molecular level. If, for example, residual stress imparted to the rotor mast by, for example, shot peening, has been lost to the point that yielding of the rotor mast is imminent but has not yet occurred, an XRD inspection can detect such residual stress loss.

The fatigue damage can reduce the useful life of the part in normal service. In the past, since fatigue damage could not be determined, this caused parts to be removed from service early in order to be conservative. Such early removal has been performed because service personnel were unable to determine whether the rotor mast was damaged to the point of needing to be replaced. The XRD inspection can serve to eliminate false positives and consequent unnecessary removal of rotor masts from service and also can be used to permit damaged rotor masts to be detected earlier than was the case when TIR inspections alone were employed.

In a typical process, physical measurements of the rotor mast are performed first in order to determine if obvious damage to the rotor mast is present. In most cases, if the rotor mast fails the TIR inspection (i.e., run-out is well outside established tolerance values), no XRD inspection is necessary. If the rotor mast fails the TIR inspection but is sufficiently close to the established tolerance values such that the rotor mast is considered to be possibly still suitable for continued use, an XRD inspection is performed.

The XRD inspection is used to detect surface stresses in the rotor mast. These detected surface stresses may be compared, for example, to baseline XRD measurements at one or more positions on the rotor mast where it is known that the rotor mast could not possibly have been overloaded. The baseline XRD measurement position(s) should be unaffected and the same as when the rotor mast was produced. Either or both of baseline XRD measurements based on positions on an undamaged rotor mast or on the rotor mast where it is known that the rotor mast could not possibly have been overloaded can be utilized for comparison purposes. Structural analysis software that simulates the real world can be used to determine which portions of the rotor mast should be subjected to the XRD inspection in order to assess damage to the rotor mast. XRD measurement positions to detect surface stresses may be the same or different from measurements positions used for TIR inspection of the rotor mast.

For example, if the compressive stress on the rotor mast was $-100$ kpsi at the time of manufacture and is determined to be $-60$ kpsi from an XRD inspection, such a decrease in compressive stress may be enough for the rotor mast to be considered too damaged and therefore taken out of service (i.e., scrapped). Those having skill in the art will appreciate that compressive stress is typically presented and discussed as a negative number and that a compressive-stress measurement with a greater absolute value represents a greater compressive stress. For example, a compressive-stress measurement of $-100$ kpsi indicates greater compressive stress than $-60$ kpsi.

Where on the rotor mast to measure baseline measurement positions is determined by the structural analysis software. The structural analysis software determines where weak areas are located on the rotor mast. These areas are the most likely to yield in response to a given load.

In the structural analysis software, loads are applied to the rotor mast and a nonlinear analysis is used that allows residual stresses to be ascertained after loading has been removed. The loading, which is matched for a given incident, is applied, the rotor mast is allowed to get past yield such that the surface is no longer going to deform back to where it started prior to the loading, the load is returned to zero, and the surface is evaluated to determine where there are and are not residual stresses due to the loading. To determine the baseline measurement position(s), position(s) where there is zero or minimal surface residual stress are selected. These positions will vary in different rotor-mast designs. In similar fashion, the XRD inspection position(s) are typically performed at places on the rotor mast where the structural analysis software would predict that surface residual stresses would be reduced first and peak in response to loading.

FIG. 3 illustrates a flow process for inspection of a rotor mast. The process begins at step 302, at which step a rotor-mast inspection trigger occurs. The rotor-mast inspection trigger may be, for example, an incident involving a rotorcraft such as an accident. The rotor-mast inspection trigger may also be, for example, scheduled maintenance or overhaul of the rotorcraft.

From step 302, execution proceeds to step 304. At step 304, a TIR inspection of the rotor mast is undertaken. From step 304, execution proceeds to step 306. At step 306, a determination is made as to whether the results of the TIR inspection are within established tolerance values. If it is determined that the results of the TIR inspection are within established tolerance values, execution proceeds to step 308. At step 308, the rotor mast is returned to service.

At step 306, if it is determined that the results of the TIR inspection are not within established tolerance values, execution proceeds to step 310. At step 310, an engineering review of the results of the TIR inspection is performed. From step 310, execution proceeds to step 312. At step 312, a determination is made as to whether the results of the TIR inspection are acceptable to engineering. The determination at step 312 is whether the rotor mast is deemed to be suitable for use pending subsequent XRD inspection of the rotor mast. This is notwithstanding the fact that the that the rotor mast is considered to be outside established TIR-inspection tolerance values.

If, at step 312, the results of the TIR inspection are acceptable to engineering, execution proceeds to step 316. If, at step 312, the results of the TIR inspection are not acceptable to engineering, execution proceeds to step 314, at which step the rotor mast is scrapped. At step 316, an XRD inspection is performed. From step 316, execution proceeds to step 318. At step 318, a determination is made as to whether the XRD inspection results are considered acceptable. If, at step 318, the results of the XRD inspection are considered acceptable, the rotor mast is returned to service at step 320. If, at step 318, the results of the XRD inspection are not considered to be acceptable, execution proceeds to step 322, at which step the rotor mast is scrapped.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of evaluating fatigue damage of a rotor mast, the method comprising:
    performing an x-ray diffraction ("XRD") inspection of the rotor mast manufactured using a shot-peening process;
    assessing fatigue damage sustained by the rotor mast based on results of the XRD inspection, wherein the step of assessing comprises comparing surface stress of the rotor mast measured via the XRD inspection to surface stress of the rotor mast at manufacture; and
    determining whether the rotor mast is suitable for continued use based on the assessed fatigue damage.

2. The method of claim 1, comprising, prior to the step of performing the XRD inspection:
    performing a total-indicated-run-out ("TIR") inspection; and
    responsive to the step of performing the TIR inspection, determining whether results of the TIR inspection are acceptable.

3. The method of claim 2, comprising:
    wherein the results of the TIR inspection are acceptable if the results are within pre-defined tolerance values; and
    wherein the results of the TIR inspection are not acceptable if the results are not within the pre-defined tolerance values.

4. The method of claim 1, wherein the step of determining whether the rotor mast is suitable for continued use comprises:
    responsive to the XRD inspection indicating a change in surface stress of the rotor mast relative to a standard is less than a pre-defined threshold, determining that the rotor mast is suitable for continued use; and
    responsive to the XRD inspection indicating a change in surface stress of the rotor mast relative to a standard is greater than or equal to a pre-defined threshold, determining that the rotor mast is not suitable for continued use.

5. The method of claim 4, wherein the surface stress is measured in kilo pounds per square inch ("KPSI").

6. The method of claim 1, the method comprising, prior to the step of performing the XRD inspection:
    performing a total-indicated-run-out ("TIR") inspection; and
    responsive to the step of performing the TIR inspection, determining whether results of the TIR inspection are within pre-defined tolerance values.

7. The method of claim 6, comprising, responsive to the results of the TIR inspection being within the pre-defined tolerance values, determining that the rotor mast is suitable for continued use.

8. The method of claim 7, comprising, responsive to the results of the TIR inspection not being within the pre-defined tolerance values, determining that the rotor mast is not suitable for continued use.

9. The method of claim 6, comprising:
    responsive to the results of the TIR inspection not being within the pre-defined tolerance values, performing an engineering review of the results of the TIR inspection; and
    responsive to the engineering review concluding that the results of the TIR inspection are acceptable, performing the XRD inspection.

10. The method of claim 1, wherein the step of performing the XRD inspection is performed at positions of the rotor mast expected to be damaged most in an accident based on structural analysis performed on the rotor mast.

11. The method of claim 1, wherein the step of performing the XRD inspection comprises performing the XRD inspection at positions of the rotor mast expected to be damaged least during an accident based on structural analysis performed on the rotor mast.

12. The method of claim 1, wherein the step of determining whether the rotor mast is suitable for continued use comprises:
    responsive to the XRD inspection indicating surface stress of the rotor mast is greater than a pre-defined threshold, determining that the rotor mast is suitable for continued use; and
    responsive to the XRD inspection indicating surface stress is less than or equal to a pre-defined threshold, determining that the rotor mast is not suitable for continued use.

13. A method of evaluating fatigue damage of a rotor mast, the method comprising:
    performing an x-ray diffraction ("XRD") inspection of the rotor mast manufactured using a shot-peening process at positions of the rotor mast most likely to be damaged in an accident;
    assessing fatigue damage sustained by the rotor mast based on results of the XRD inspection, wherein the step of assessing comprises comparing surface stress of the rotor mast measured via the XRD inspection to surface stress of the rotor mast at manufacture; and
    responsive to the step of assessing the fatigue damage, determining whether the rotor mast is suitable for continued use.

14. The method of claim 13, wherein the step of determining whether the rotor mast is suitable for continued use comprises, responsive to the XRD inspection indicating a change in surface stress of the rotor mast relative to a standard is greater than a pre-defined threshold, determining that the rotor mast is suitable for continued use.

15. The method of claim 14, wherein the step of determining whether the rotor mast is suitable for continued use comprises, responsive to the XRD inspection indicating a change in surface stress of the rotor mast relative to a standard is less than or equal to a pre-defined threshold, determining that the rotor mast is not suitable for continued use.

16. The method of claim 13, wherein the step of determining whether the rotor mast is suitable for continued use comprises:
   responsive to the XRD inspection indicating surface stress of the rotor mast is greater than a pre-defined threshold, determining that the rotor mast is suitable for continued use; and
   responsive to the XRD inspection indicating surface stress is less than or equal to a pre-defined threshold, determining that the rotor mast is not suitable for continued use.

17. The method of claim 13, wherein the step of performing the XRD inspection is performed at positions of the rotor mast expected to be damaged most in an accident based on structural analysis performed on the rotor mast.

18. The method of claim 13, wherein the step of performing the XRD inspection comprises performing the XRD inspection at positions of the rotor mast expected to be damaged least during an accident based on structural analysis performed on the rotor mast.

* * * * *